(12) United States Patent
Hu

(10) Patent No.: US 7,333,714 B2
(45) Date of Patent: Feb. 19, 2008

(54) METHOD AND SYSTEM FOR PERFORMING REVERSE PLAY OF SD MPEG VIDEO

(75) Inventor: Qiang Hu, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 907 days.

(21) Appl. No.: 10/776,078

(22) Filed: Feb. 10, 2004

(65) Prior Publication Data

US 2005/0175314 A1   Aug. 11, 2005

(51) Int. Cl.
*H04N 5/91* (2006.01)

(52) U.S. Cl. .......................................... 386/68; 386/46

(58) Field of Classification Search ................ 386/46, 386/68–70, 81, 111, 112, 120–126; 360/8; 375/240; 382/232; 348/714–719
See application file for complete search history.

(56) References Cited

U.S. PATENT DOCUMENTS 5,675,693 A * 10/1997 Kagoshima ................ 386/68
6,104,752 A * 8/2000 Yamagishi .................. 375/240
6,473,558 B1 * 10/2002 Wu et al. .................... 386/68
6,980,594 B2 * 12/2005 Wang et al. ............ 375/240.12
2004/0264924 A1* 12/2004 Campisano et al. .......... 386/68

* cited by examiner

*Primary Examiner*—Thai Q. Tran
*Assistant Examiner*—Mishawn Dunn
(74) *Attorney, Agent, or Firm*—McAndrews, Held & Malloy, Ltd.

(57) ABSTRACT

One or more methods and systems to efficiently process MPEG video in order to perform a reverse play or slow rewind function are presented. The method reduces system bandwidth required to implement the reverse play function when SD MPEG video is received by the MPEG decoder. Furthermore, the method maximizes the use of memory resources when one or more video frame buffers are implemented. The system comprises a first subsystem feeding one or more sequences of frames (e.g., feeding sessions) to a second subsystem. The first subsystem defines a set of parameters that is used to determine the one or more feeding sessions provided to the second subsystem. The second subsystem subsequently decodes the one or more feeding sessions using the set of parameters such that the video may be displayed.

24 Claims, 7 Drawing Sheets

METHOD AND SYSTEM FOR PERFORMING REVERSE PLAY OF SD MPEG VIDEO

RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Various functionalities have been implemented in devices such as digital set-top-boxes or personal video recorders (PVRs) in order to conveniently manipulate video data. PVRs allow a user to employ one or more indexing techniques or trick modes that include fast forward, slow motion, frame advance, and reverse play in order to provide a more desirable viewing experience to a user. These trick modes may be incorporated in the processing of video data. However, some of these trick modes are not easily implemented when processing MPEG video.

PVRs and digital set-top-boxes may incorporate one or more MPEG video decoders. These video decoders may be used to decode both HD and standard definition (SD) MPEG video streams. However, during processing of HD MPEG video data, the MPEG video decoder typically employs memory resources that are capable of implementing only three or four video frame buffers. Likewise, the processing of SD MPEG video data is limited to the use of the same number of video frame buffers used when HD MPEG is received—three of four video frame buffers. Unfortunately, using a few video frame buffers when performing trick function processing, such as a reverse play or a slow rewind decode on an SD MPEG stream, requires a significant amount of processing resources from the MPEG decoder. When using only a few (i.e., three or four) video frame buffers, the total number of frames processed by the MPEG decoder becomes relatively large when decoding a segment of a particular SD MPEG data stream. Hence, the processing load encountered by MPEG decoder may be significantly undesirable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method and system to efficiently process MPEG video to perform a reverse play or slow rewind function. The method reduces system bandwidth required to implement the reverse play function when SD MPEG video is received by the MPEG decoder. Further, the method maximizes the use of memory resources when one or more video frame buffers are implemented. The system comprises a first subsystem feeding one or more sequences of frames (e.g., feeding sessions) to a second subsystem. The first subsystem defines a set of parameters that is used to determine the one or more feeding sessions provided to the second subsystem. The second subsystem subsequently decodes the one or more feeding sessions using the set of parameters such that the video may be displayed.

In one embodiment, the method of efficiently decoding MPEG video to implement a reverse play or slow rewind function comprises receiving MPEG video, parsing the MPEG video data into segments, determining the type of video received, generating one or more feeding sessions, characterizing the one or more feeding sessions using one or more parameters, decoding the one or more feeding sessions into frames, storing the frames into a number of video frame buffers, wherein the video frame buffers occupy a memory space corresponding to the type of video received.

In one embodiment, a method of efficiently decoding MPEG video bit streams to implement a reverse play or slow rewind function comprises determining the type of MPEG video received, and implementing a first number of video frame buffers based on the type of MPEG video received.

In one embodiment, a system of efficiently decoding MPEG video bit streams to implement a reverse play or slow rewind function comprises a first digital logic circuitry, a first software module, a second digital logic circuitry, and a second software module.

In one embodiment, a system of efficiently decoding MPEG video bit streams to implement a reverse play or slow rewind function comprises a first subsystem capable of generating one or more feeding sessions, and a second subsystem capable of decoding the one or more feeding sessions received from the first subsystem.

In one embodiment, a method to reverse play MPEG video comprises determining a first number of frames to be decoded in a feeding session, determining a second number of frames to be displayed in the feeding session, determining a third number of reference frames to be displayed in the feeding session, and determining a fourth number of B frames to be displayed in the feeding session.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to efficiently perform a reverse play function for MPEG video streams using an MPEG video decoder in a HDTV or HD set-top-box. Aspects of the present invention improve system performance by reducing bandwidth and using system resources, such as memory resources for example, more efficiently during a SD MPEG video decoding operation. When SD MPEG video is received, the memory resources implement a maximum number of video frame buffers. The system comprises a first subsystem feeding one or more sequences of frames (feeding sessions) to a second subsystem. The first subsystem defines a set of parameters that is used to determine the one or more feeding sessions provided to the second subsystem. The second subsystem subsequently decodes the one or more feeding sessions using the set of parameters such that the video may be displayed. The MPEG video streams processed by the system described may comprise MPEG I or MPEG II type of video streams, for example.

Figure 1:
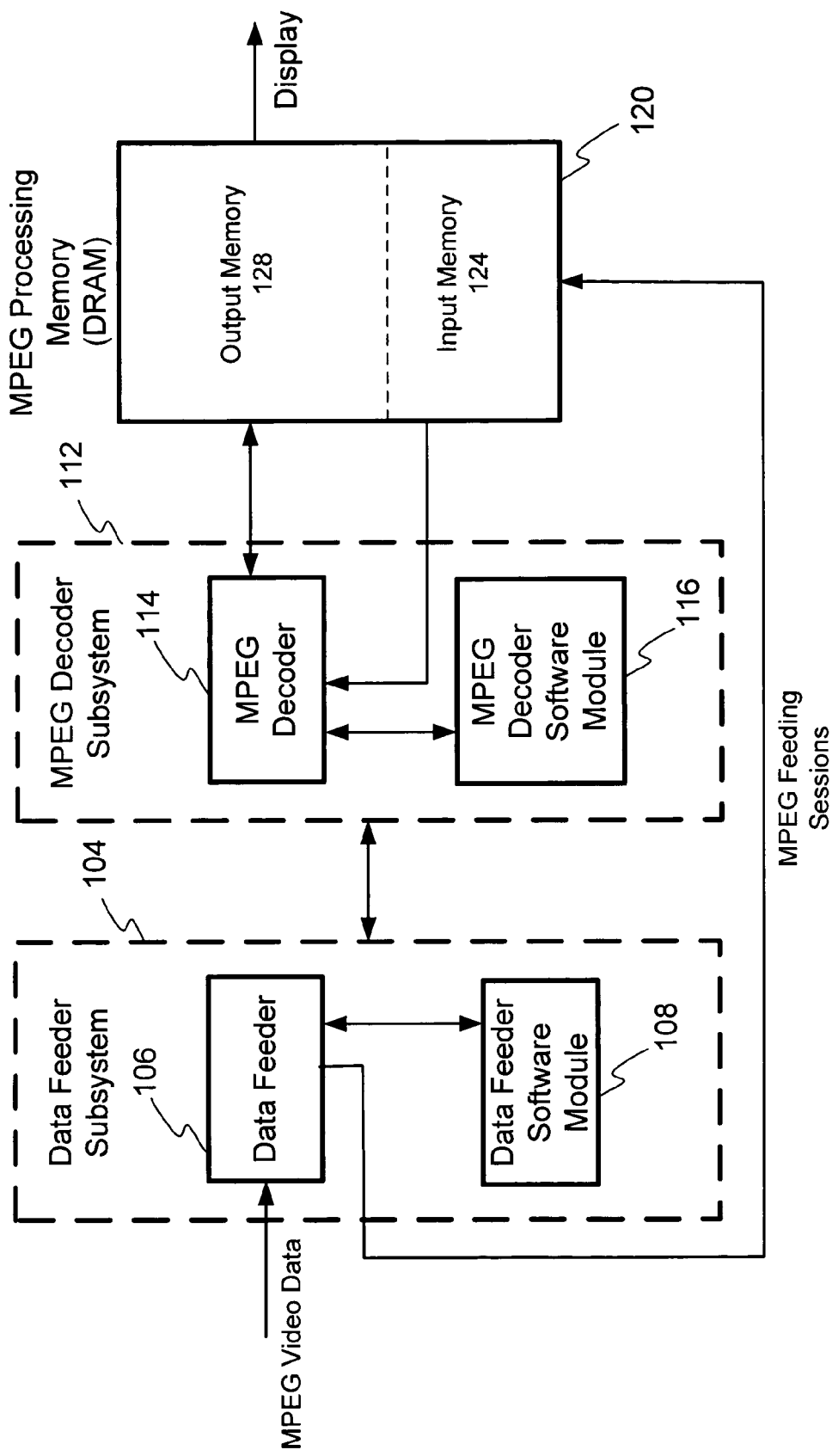
FIG. 1 is a block diagram of an MPEG reverse play decode system in accordance with an embodiment of the invention.

FIG. 1 is a block diagram of an MPEG reverse play decode system in accordance with an embodiment of the invention. The MPEG reverse play decode system comprises a data feeder subsystem 104, a MPEG decoder subsystem 112, and a MPEG processing memory 120. The data feeder subsystem (DFS) 104 comprises a data feeder 106 and a data feeder software module 108. The DFS 104 communicates to the MPEG decoder subsystem (MDS) 112. The MDS 112 comprises a MPEG decoder 114 and an MPEG decoder software module 116. The MDS 112 communicates with the MPEG processing memory 120 as shown. The MPEG processing memory 120 comprises an input memory 124 and an output memory 128. The output memory 128 functions as one or more video frame buffers used to store one or more video frames prior to displaying on a display. The input memory 124 and output memory 128 comprises non-overlapping portions or sections of the MPEG processing memory 120. In one embodiment, the MPEG processing memory 120 comprises a random access memory (RAM).

In one embodiment, the data feeder subsystem 104 and MPEG decoder subsystem 112 is implemented using a system on chip (SOC). In another embodiment, the data feeder 106 and the MPEG decoder 114 is implemented using a SOC. In either instance, the SOC may employ memory resources provided by a unified memory architecture (UMA). The UMA allows the SOC as well as one or more other devices to access and utilize a common memory such as the MPEG processing memory 120 described in FIG. 1.

The data feeder subsystem (DFS) 104 is used to generate one or more feeding sessions for a particular MPEG video segment or GOP. The data feeder 106 parses the MPEG stream into segments, with each segment starting and including a single I frame. The segments may be described as a Group of Pictures (GOP) comprising a single I frame. After the received MPEG stream is parsed into segments, each segment may be characterized by one or more feeding sessions. The data feeder subsystem 104 generates one or more feeding sessions that are fully defined by one or more sets of "feeding session parameters" provided by the data feeder software module 108. The feeding sessions generated by the data feeder 106 are transmitted to the MPEG decoder 114 by way of the input memory 124. The input memory 124 stores the feeding sessions for subsequent processing by the MPEG decoder 114. A feeding session comprises, for example, a sequence of frames that starts and includes a single I frame. It may be alternatively defined as, for example, a Group of Pictures (GOP) having only one I frame. The feeding session may generally involve a minimum number of frames necessary for a MPEG decoder 114 to properly display a particular number of frames, given a maximum number of video frame buffers available for use.

The data feeder 106 comprises hardware such as digital logic circuitry used to receive MPEG video data. The MPEG video data may be received from one or more storage media such as a magnetic hard drive or a compact disc. The data feeder 106 operates with the data feeder software module 108 to determine if the incoming MPEG video stream comprises an HD MPEG video stream or an SD MPEG video stream. The data feeder 106 operates on the incoming MPEG video stream one segment at a time. The data feeder software module 108 comprises a set of computer instructions or software resident in a data storage device within the DFS 104. After analyzing the MPEG video stream, the DFS 104 operates on each MPEG video segment such that one or more feeding sessions are generated. The one or more feeding sessions are subsequently stored in the input memory 124. In addition, the DFS 104 transmits one or more parameters (i.e., such as the number of frames to be decoded, the number of frames to be displayed, the number of B frames, and/or the number of reference frames) to the MDS 112 in order to describe the feeding sessions generated by the DFS 104. In one embodiment, the type or structure of the video stream to be decoded may be communicated to the MDS 112. For example, the DFS 104 may indicate that the video stream to be processed by the MPEG decoder subsystem 112 will be used to display an SD formatted picture. In another instance, the DFS 104 may communicate to the MDS 112 that the video to be displayed comprises an HD type of picture. The type of picture to be displayed affects the number of frame buffers implemented in the output memory 128 of the MPEG processing memory 120. Due to resolution requirements, processing HD frames will utilize a larger buffer space in memory compared to processing SD frames. As a consequence, the number of SD video frame buffers implemented in the output memory 128 will be larger than the number of HD video frame buffers implemented. In one embodiment, the number of video frame buffers used is inversely proportional to the display resolution of the video to be displayed. Hence, the number of video frame buffers implemented in the output memory 128 is adjusted to maximize memory space provided by the output memory 128.

The data feeder software module 108 is used to apply a first algorithm to the MPEG video stream that facilitates the generation of one or more feeding sessions for the MPEG decoder subsystem 112. The one or more feeding sessions generated by the data feeder 106 comprise one or more sequence of frames that are used by the MPEG decoder subsystem 112 to properly display a number of frames. The number of frames displayed in a feeding session is limited by the number of video frame buffers implemented. The data feeder software module 108 is used to determine the values of one or more parameters used to define and generate the one or more sequences of frames also known as feeding sessions. These feeding sessions are subsequently decoded and displayed by the MPEG decoder subsystem 112. These parameters will be termed feeding session parameters. The feeding session parameters M, N, Q, and R are defined as follows:

M—frames to be decoded.
N—frames to be displayed.
Q—number of reference frames to be displayed.
R—number of B frames to be displayed.
C—number of frames until a reference frame is encountered. (This variable is used by the data feeder algorithm to determine the feeding session parameters M, N, Q, and R.)

As illustrated in FIG. 1, the DFS 104 bi-directionally communicates with the MDS 112. One or more feeding session parameters, such as M, N, Q, and R are transmitted from the DFS 106 to the MDS 112. The MDS 112 may acknowledge the receipt of such feeding session parameters.

Correspondingly, the MDS 112 comprises a MPEG decoder 114 and a MPEG decoder software module 116. The MPEG decoder software module 108 applies a second algorithm to the one or more feeding sessions provided by the input memory 124 of the MPEG processing memory 120. The MPEG decoder 114 operates with the MPEG decoder software module 116 to appropriately decode the one or more feeding sessions stored in the input memory 124. The MPEG decoder 114 comprises hardware such as a digital logic circuitry. The input memory 124 stores one or more feeding sessions generated by the DFS 104. After receiving the one or more feeding sessions, the MPEG decoder 114 properly stores decoded video frames within output memory 128 for displaying to a display. As shown in FIG. 1, the MPEG decoder 114 transmits decoded video frames to the output memory 128. The MPEG decoder software module 116 comprises a set of computer instructions or software, resident in a data storage device within the MDS 112, capable of implementing the second algorithm required to properly process the one or more MPEG video feeding sessions provided by the DFS 104. The MPEG decoder 114 bi-directionally communicates with the output memory 128 in order to properly decode successive frames as well as store decoded frames that will be displayed on a display. The output memory 128 subsequently transmits the video frames to the display. It is contemplated that one or more timing signals and/or control signals may be used to appropriately transmit the decoded video frames from the output memory 128 to the display.

Figure 2:
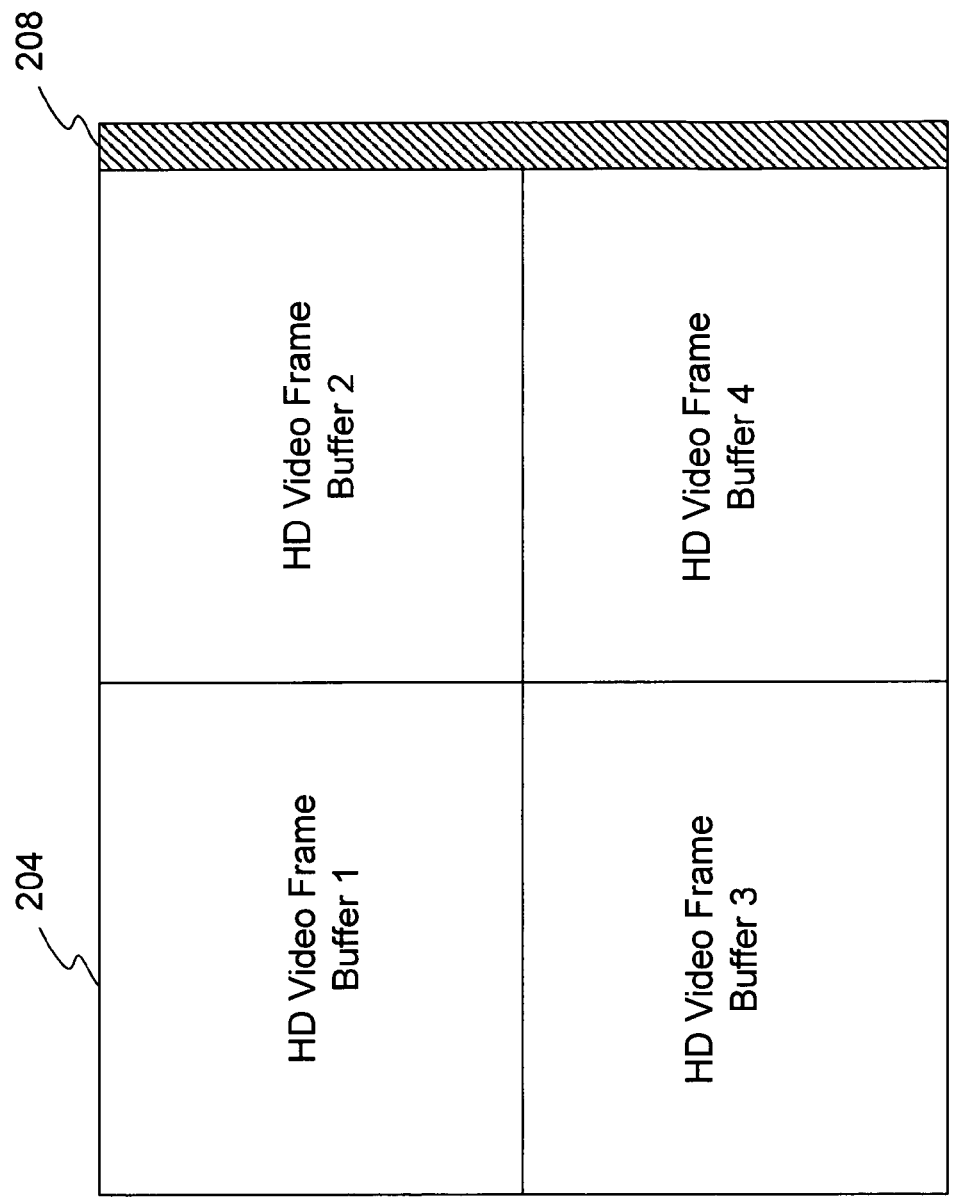
FIG. 2 is a relational block diagram illustrating 4 HD video frames occupying the available memory space provided by the output memory shown in FIG. 1, in accordance with an embodiment of the invention.

FIG. 2 is a relational block diagram illustrating 4 HD video frames occupying the available memory space provided by the output memory shown in FIG. 1, in accordance with an embodiment of the invention. When the data feeder and data feeder software determine that the received MPEG video data comprises HD MPEG video, the output memory provides an available memory space capable of accommodating a maximum of 4 HD video frames. As shown in FIG. 2, the available memory space may be configured into a maximum of 4 identically sized regions. Each of the four regions represents one HD video frame buffer 204. There are a total of 4 HD video frame buffers that the output memory implements. The output memory that is not occupied by a video frame buffer 204 is unusable memory space 208 resulting from differences in alignment of the HD video frames within the output memory space. In FIG. 2, the unusable memory space 208 is depicted as a filled-in area.

Figure 3:
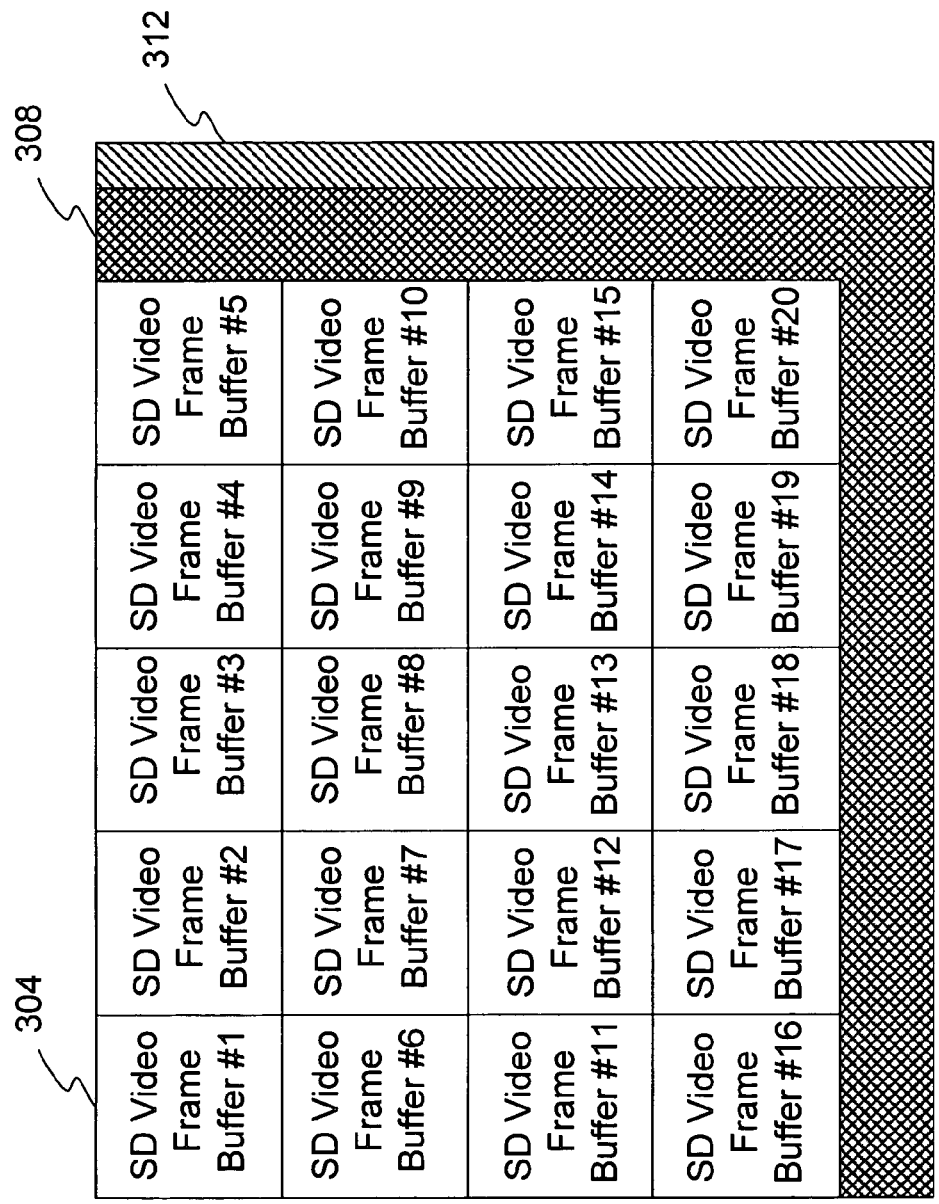
FIG. 3 is a relational block diagram illustrating 20 SD video frames occupying the available memory space provided by the output memory shown in FIG. 1, in accordance with an embodiment of the invention.

FIG. 3 is a relational block diagram illustrating 20 SD video frames occupying the available memory space provided by the output memory shown in FIG. 1, in accordance with an embodiment of the invention. In this embodiment, when the data feeder and data feeder software determine that the received MPEG video data comprises SD MPEG video, the output memory space is configured to provide an available memory space capable of accommodating a maximum of 20 SD video frames. As shown in FIG. 3, the available memory space may be configured into a maximum of 20 identically sized regions. Each region represents one SD video frame buffer 304. There are a total of 20 SD video frame buffers that the output memory implements. The output memory that is not occupied by a video frame buffer 304 may comprise unusable memory space 308, 312 resulting from differences in alignment of the SD video frames within the output memory space. In FIG. 3, the unusable memory space 308, 312 is depicted as either crosshatched or filled-in areas. In this embodiment, it is evident that the unusable memory space 308, 312 exceeds the amount of unusable memory space illustrated in FIG. 2 by the amount shown in the cross-hatched area 308. No additional SD video frame buffers may be implemented because the unusable memory space 308, 312 does not provide ample memory space. It is contemplated that in other embodiments, the output memory may implement other than the exemplary 20 SD video frame buffers described in the embodiment described previously.

Figure 4A:
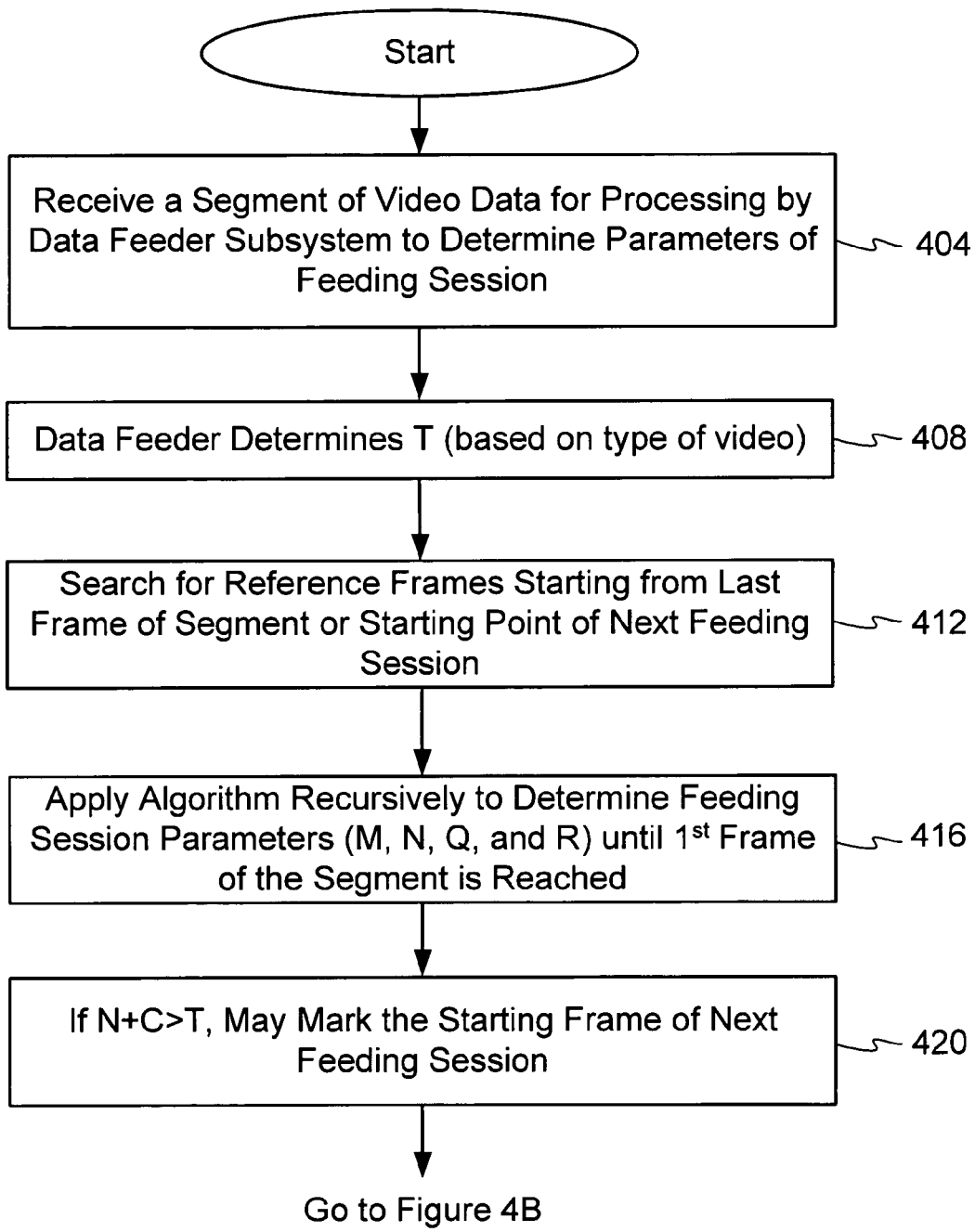
FIGS. 4A and 4B are operational flow diagrams illustrating a process used by the data feeder subsystem to implement a reverse play or slow rewind function when decoding MPEG video in accordance with an embodiment of the present invention.
Figure 4B:
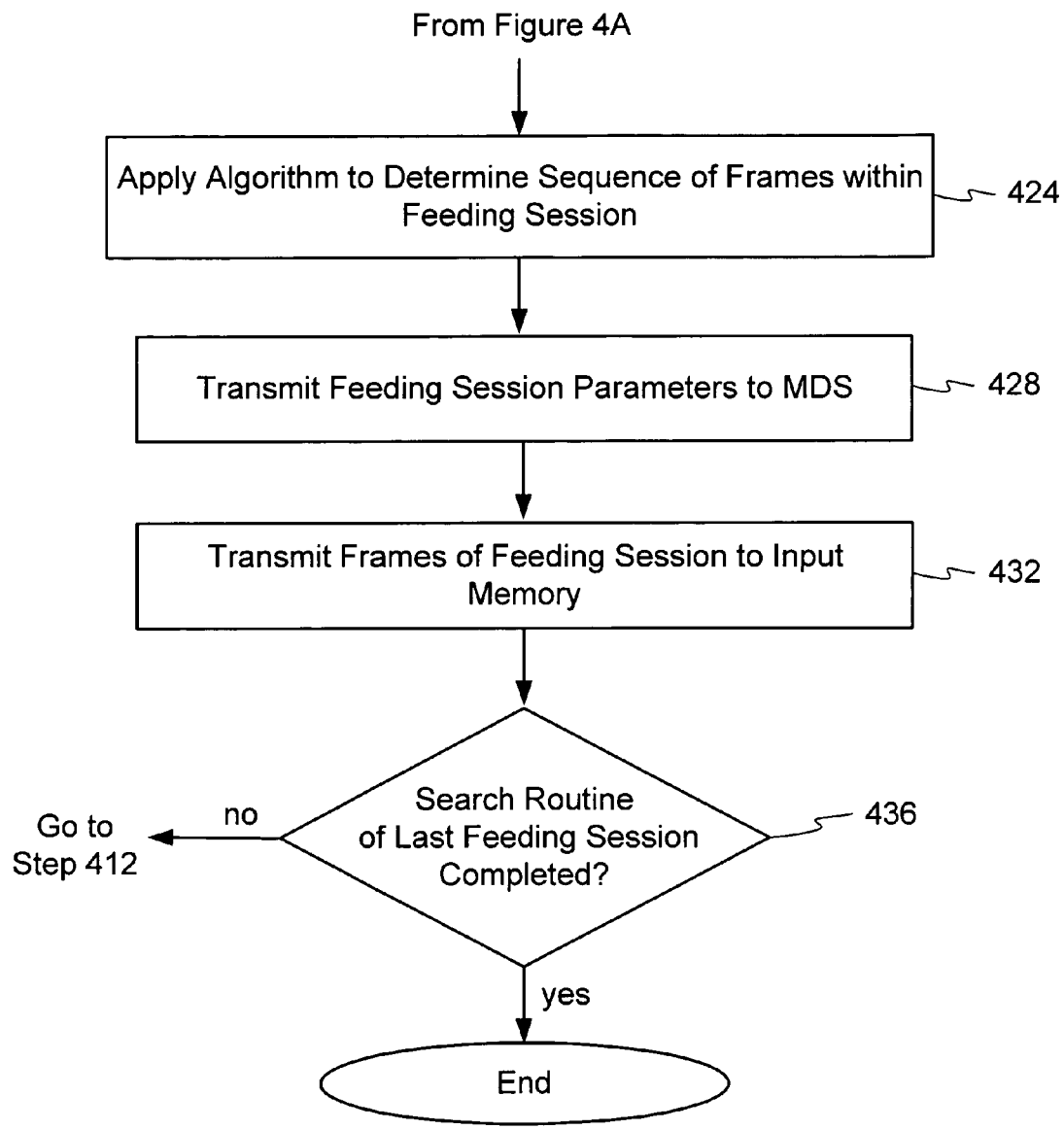

FIGS. 4A and 4B are operational flow diagrams illustrating a process used by the data feeder subsystem to implement a reverse play or slow rewind function when decoding MPEG video in accordance with an embodiment of the present invention. At step 404, an MPEG video data segment is received by the DFS where it is processed by the data feeder subsystem. The segment may be transmitted from a storage media such as an exemplary hard disk drive. The segment may be analyzed by the data feeder software module and subsequently characterized in terms of a number of parameters—M, N, Q, and R, whose definitions were provided earlier. At step 408, the type of MPEG video data received is determined by the data feeder subsystem. In one embodiment, the type of MPEG video data received comprises HD MPEG or SD MPEG video data. The type of MPEG video data received relates to the resolution of frames to be displayed on a display, monitor, or television. In one embodiment, receiving HD MPEG video data results in implementing 3 or 4 video frame buffers in the output buffer of the MPEG processing memory (previously described in FIG. 1). In one embodiment, receiving SD MPEG video data results in implementing an increased number of video frame buffers within the output memory of the MPEG processing memory. In one embodiment, the number of video frame buffers implemented in output memory of the MPEG processing memory is increased by a factor corresponding to the ratio equal to (HD frame resolution/SD frame resolution). A parameter T is used to define an integer number of video frame buffers implemented in the output memory of the MPEG processing memory. (The parameter T includes a buffer within the output memory used in displaying the frames.) In one embodiment, a typical HD frame resolution corresponds to 1920×1088 while a typical SD frame resolution corresponds to 720×480. If one assumes that the number of video frame buffers implemented for HD MPEG video data is four, a change in resolution from HD to that of SD results in increasing the number of video buffers implemented in output memory from a value of T=4 to T=4×(1920×1088)/((720×480)=24. In another embodiment, T is equal to an integer value less than 24 because of memory alignment requirements as the number of video frame buffers increases to 24. As a consequence, in one embodiment, T is equal to 20 when the received MPEG video data segment corresponds to SD MPEG video. At step 412, the data feeder algorithm is applied to the MPEG video data segment in order to determine M, N, Q, and R parameters that characterize each feeding session. The algorithm initially sequentially searches for reference frames starting from the last frame of the segment. The algorithm facilitates the generation of one or more feeding sessions. Each feeding session is characterized by a sequence of frames that is processed by the MPEG decoder subsystem using the input and output memories of the MPEG processing memory. The algorithm provides for an increased number of frame buffers when an SD MPEG video segment is received. This allows for the efficient use of output memory in the MPEG processing memory. During the search routine, a frame in the segment may be marked as a starting point for a subsequent search. The starting point defines the last frame of the next feeding session. The one or more feeding sessions are used to populate the video frame buffers implemented within the output memory. At step 416, the data feeder algorithm is applied recursively to the segment until the first frame of the segment is reached. (The data feeder algorithm will be described in greater detail with reference to FIG. 5.) Referring to step 420, the data feeder algorithm analyzes the segment during its search process to determine if N+C>T. If this condition is met, the starting frame of the next feeding session may be marked. At step 424, the data feeder algorithm generates the sequence of frames within the feeding session by way of the feeding session parameters (M, N, Q, and R) it has determined. At step 428, the feeding session parameters are transmitted to the MPEG decoder subsystem (MDS). The MDS will use the feeding session parameters in order to properly decode the feeding sessions received by the DFS. At step 432, the frames of the feeding session are input into the input memory of the MPEG processing memory. Next, at step 436, if the search routine of the last feeding session is completed, the process ends. Otherwise, the process reverts back to step 412, where the next feeding session is searched beginning at its marked starting point.

Figure 5:
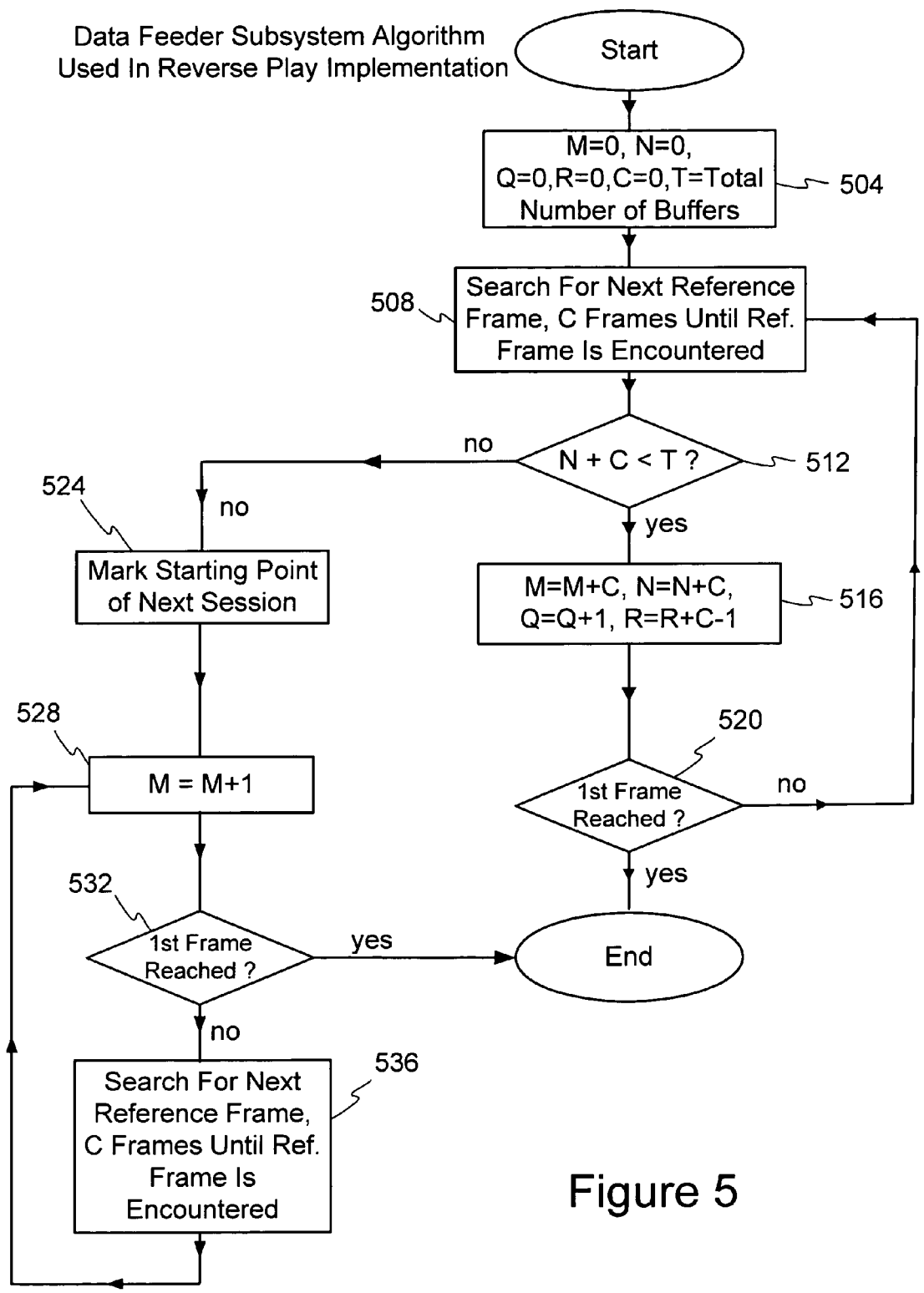
FIG. 5 is an operational flow diagram illustrating the algorithm used by the data feeder subsystem to implement a reverse play or slow rewind function when decoding MPEG video in accordance with an embodiment of the present invention.

FIG. 5 is an operational flow diagram illustrating the algorithm used by the data feeder subsystem to implement a reverse play or slow rewind function when decoding MPEG video in accordance with an embodiment of the present invention. As shown, the algorithm is used to determine the feeding session parameters. At step 504, the feeding session parameters, M, N, Q, R, and C are set to zero. T, the number of video frame buffers implemented in output memory, is determined by the data feeder subsystem as previously mentioned. At step 508, a received MPEG video data segment is searched for reference frames starting from the last frame in the segment. C is defined as the number of frames passed until a reference frame is encountered. In one embodiment, the reference frames comprise P or I frames. At step 512, the equation N+C<T is evaluated. If N+C is less than T, the process continues at step 516. At step 516, the parameters or variables M and N are incremented by C. The parameter or variable Q is incremented by one. The parameter or variable R is incremented by C and decremented by one. The defining equations are shown in FIG. 5, step 516. Next, the process proceeds to step 520, where an evaluation is made whether the first frame has been reached. If the first frame is reached, the algorithm ends. However, if the first frame of the segment is not reached, the process reverts to step 508, in which the next reference frame is sought. C is determined and the process continues at step 512. If N+C is not less than T, the process continues at step 524, where the starting point of the next feeding session is marked. At step 528, M is incremented by one. Then, at step 532, an evaluation is made whether the first frame has been reached in the segment. If the first frame has been reached, the process ends. Otherwise, the process continues at step 536. At step 536, the algorithm searches for the next reference frame and tabulates the number of frames, C, until another reference frame is encountered. Thereafter, the process reverts to step 528, in which M is incremented by one. Again, at step 532, the process continues until the first frame is reached.

The algorithm described in FIG. 5 may be used to determine the feeding session parameters of one or more feeding sessions. In order to illustrate an application of the data feeder algorithm, the reader may refer to the following first example. The first example illustrates the following exemplary segment received by the data feeder subsystem:

EXAMPLE 1

I0, P3, B1, B2, P6, B4, B5, P9, B7, B8, P12, B10, B11, P15, B13, B14. The segment contains a total of 16 frames. There are a total of 10 B frames.

If we use the sample segment provided by Example 1, wherein the received bit stream or MPEG video data segment is a HD stream and an exemplary 4 video frame buffers (T=4) are available to the MPEG decoder, the feeding session parameters and feeding session may be determined using the algorithm illustrated in FIG. 5 as shown below.

Feeding Session 1: Feed I0, P3, P6, P9, P12, P15, B13, B14 and instruct the MPEG decoder to decode 8 frames and display 3 frames, including 1 reference frames and 2 B frames. The frames P15, B14, B13 are read out from the output memory into a display. The feeding session parameters are as follows: M=8, N=3, Q=1, and R=2.

Feeding Session 2: Feed I0, P3, P6, P9, P12, B10, B11, and instruct the MPEG decoder to decode 7 frames and display 3 frames, including 1 reference frame and 2 B frames. The frames P12, B11, B10 are read out from the output memory into a display. The feeding session parameters are as follows: M=7, N=3, Q=1, and R=2.

Feeding Session 3: Feed I0, P3, P6, P9, B7, B8, and instruct the MPEG decoder to decode 6 frames and display 3 frames, including 1 reference frame and 2 B frames. The frames P9, B8, B7 are read out from the output memory into a display. The feeding session parameters are as follows: M=6, N=3, Q=1, and R=2.

Feeding Session 4: Feed I0, P3, P6, B4, B5, and instruct the MPEG decoder to decode 5 frames and display 3 frames, including 1 reference frame and 2 B frames. The frames P6, B5, B4 are read out from the output memory into a display. The feeding session parameters are as follows: M=5, N=3, Q=1, and R=2.

Feeding Session 5: Feed I0, P3, B1, B2, and instruct the MPEG decoder to decode and display 4 frames, including 2 reference frames and 2 B frames. The frames P3, B2, B1 are read out from the output memory into a display. The feeding session parameters are as follows: M=4, N=3, Q=1, and R=2.

Feeding Session 6: Feed I0, and instruct the MPEG decoder to display I0. The feeding session parameters are as follows: M=1, N=1, Q=1, and R=0.

If the bit stream is SD, 20 video frame buffers are now available to the MPEG Decoder, and as a result, only one feeding session is required:

Feeding Session 1: Feed I0, P3, B1, B2, P6, B4, B5, P9, B7, B8, P12, B10, B11, P15, B13, B14. One may instruct the Mpeg Decoder that 16 pictures are expected to be displayed, including 10 B pictures and 6 reference pictures. The frames P15, B14, B13, P12, B11, B10, P9, B8, B7, P6, B5, B4, P3, B2, B1, I0 are read out from the output memory into a display. The feeding session parameters are as follows: M=16, N=16, Q=6, and R=10.

Example 1 clearly illustrates that the decoding requirement has been reduced from decoding a total of 31 frames to that of decoding a total of only 16 frames when the number of video frame buffers is increased from 4 to 20. Hence, the processing bandwidth is reduced. In addition, the load generated by the data feeder subsystem is similarly reduced from that of storing 31 frames to that of storing only 16 frames into input memory of the MPEG processing memory. In the case of Example 1, the reduction in load corresponds to 15/31 or 48%.

In order to further illustrate the application of the data feeder algorithm, the reader may refer to the following second example illustrating the following exemplary segment received by the data feeder subsystem:

EXAMPLE 2

I0, P3, B1, B2, P6, B4, B5, P9, B7, B8, P12, B10, B11, P15, B13, B14, P18, B16, B17, P21, B19, B20, P24, B22, B23, P27, B25, B26, P30, B28, B29. This exemplary segment contains a total of 31 frames. There are a total of 20 B frames.

If we use the sample segment provided by Example 2, wherein the received bit stream or MPEG video data segment is a HD stream, and an exemplary 4 video frame buffers are available to the MPEG decoder, a total of eleven feeding sessions are required.

However, if we use the sample segment provided by Example 2, wherein the received bit stream is a SD stream and an exemplary 20 video frame buffers are available to the MPEG decoder, the feeding sessions are implemented as shown below.

Feeding Session 1: Feed I0, P3, P6, P9, P12, P15, B13, B14, P18, B16, B17, P21, B19, B20, P24, B22, B23, P27, B25, B26, P30, B28, B29. Instruct the MPEG decoder to decode 23 frames and display 18 frames, including 12 B frames and 6 reference frames. The frames P30, B29, B28, P27, B26, B25, P24, B22, B23, P21, B20, B19, P18, B17, B16, P15, B14, B13 are read out from the output memory into a display. The feeding session parameters are as follows: M=23, N=18, Q=6, and R=12.

Feeding session 2: Feed I0, P3, B1, B2, P6, B4, B5, P9, B7, B8, P12, B10, B11. Instruct the MPEG decoder to decode and display 13 frames, including 8 B pictures and 5 reference pictures. The frames P12, B11, B10, P9, B8, B7, P6, B5, B4, P3, B2, B1, I0 are read out from the output memory into a display. The feeding session parameters are as follows: M=13, N=13, Q=5, and R=8.

Figure 6:
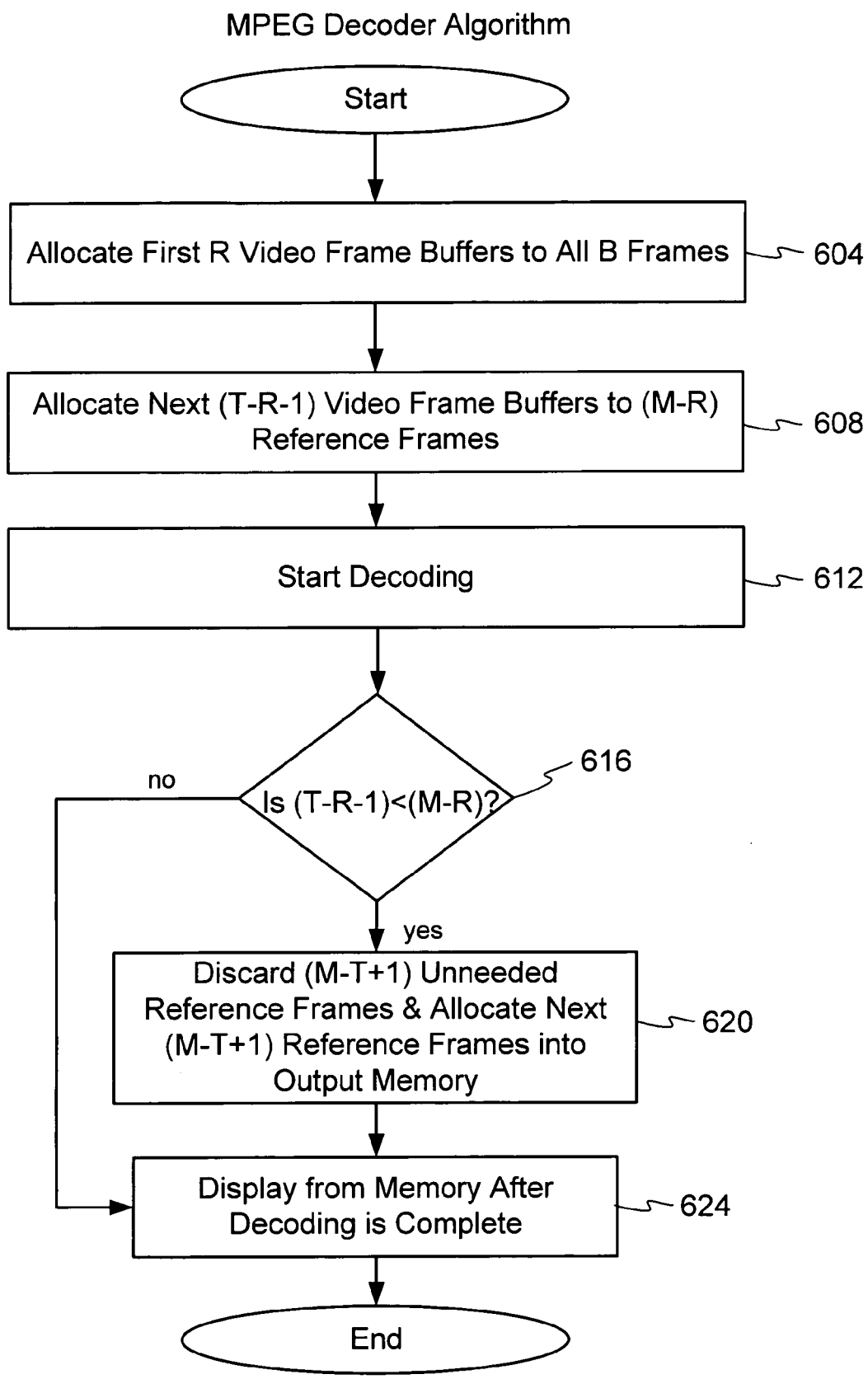
FIG. 6 is an operational flow diagram illustrating an algorithm used by the MPEG decoder subsystem to implement a reverse play or slow rewind function in accordance with an embodiment of the present invention.

FIG. 6 is an operational flow diagram illustrating an algorithm used by the MPEG decoder subsystem to implement a reverse play or slow rewind function in accordance with an embodiment of the present invention. The MPEG decoder algorithm is executed by way of the MPEG decoder operating with the MPEG decoder software module. The MPEG decoder software module executes a set of computer instructions or software capable of implementing the MPEG decoder algorithm. At step 604, the MPEG decoder algorithm allocates the first R video frame buffers to all B frames in a particular feeding session. As described earlier, one or more feeding sessions are transmitted by the DFS to the input memory of the MPEG processing memory. As was described earlier, there are a total of T video frame buffers implemented in the output memory of the MPEG processing memory. At step 608, the next (T−R−1) video frame buffers are allocated to (M−R) reference frames. (Aspects of the present invention allocate one video frame buffer in the output memory for displaying the decoded frames; as a consequence, the number of available video frame buffers available for use by the MPEG decoder subsystem is reduced by one.) Then at step 612, decoding by the MPEG decoder commences. At step 616, the MPEG decoder algorithm assesses whether the value (T−R−1) is less than the value (M−R). If (T−R−1) is less than (M−R), the process continues with step 620. At step 620, (M−T+1) reference frames in the output memory are discarded after being used by the MPEG decoder. Thereafter, the next (M−T+1) reference frames are allocated into the output memory for subsequent decoding by the MPEG decoder. The process proceeds to step 624, where the contents of the output memory are displayed after the (M−T+1) frames are utilized and all decoding processes are completed by the MPEG decoder. Step 616 determines whether the remaining video frame buffers are sufficient to hold the reference frames to be decoded. If the remaining video frame buffers are sufficient to hold the (M−R) reference frames (when (T−R−1) is not less than (M−R)), the process continues with step 624. At step 624, the frames stored or allocated in the video frame buffers are subsequently displayed from memory after the decoding of the feeding session is completed. After displaying is completed, another cycle of the MPEG decoder algorithm may commence with the next feeding session.

An example will be used to illustrate the MPEG decoder algorithm. If one uses the first feeding session of Example 2, the data feeder subsystem will transmit the feeding session parameters, M, N, Q, R, and T to the MPEG decoder subsystem. For the first feeding session, M=23, N=18, Q=6, R=12, and T=20. In other words, 23 frames are to be decoded and 18 fr are expected to be displayed. 6 reference frames and 12 B frames are expected to be displayed. The number of video frame buffers implemented in output memory is 20. The MPEG decoder allocates the first 12 video frame buffers to all of the B frames. The remaining 7 video frame buffers (denoted as Rf1, Rf2, . . . Rf7) will be allocated to hold the reference frames.

The feeding order or sequence of frames in the first feeding session is: I0, P3, P6, P9, P12, P15, B13, B14, P18, B16, B17, P21, B19, B20, P24, B22, B23, P27, B25, B26, P30, B28, B29.

The MPEG decoder will allocate the decoded frames into the frame buffers as follows:

I0->Rf1
P3->Rf2
P6->Rf3
P9->Rf4
P12->Rf5
P15->Rf6
P18->Rf7
P21->Rf1
P24->Rf2
P27->Rf3
P30->Rf4

As illustrated above, frames I0, P3, P6, and P9 are discarded such that frames P21, P24, P27, and P30 may be stored in the output memory of the MPEG processing memory. After decoding is completed, the contents of output memory may be read out to a display.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of efficiently decoding MPEG video to implement a reverse play or slow rewind function comprising:
   receiving said MPEG video;
   determining the type of said MPEG video received;
   arranging a portion of said MPEG video received into one or more sequences of frames;
   characterizing each of said one or more sequences of frames using one or more parameters;
   decoding said one or more sequences of frames based on said one or more parameters; and
   storing said frames into a number of video frame buffers, said number of video frame buffers implemented based on said type of said MPEG video received.

2. The method of claim 1 wherein said determining, arranging, and characterizing is performed by a first subsystem.

3. The method of claim 1 wherein each of said one or more sequences of frames comprises a feeding session.

4. The method of claim 3 wherein said feeding session is stored into a first portion of memory.

5. The method of claim 4 wherein said memory comprises a random access memory.

6. The method of claim 1 further comprising displaying said frames from said video frame buffers onto a display.

7. The method of claim 6 wherein said video frame buffers are implemented in a second portion of memory.

8. The method of claim 7 wherein said memory comprises a random access memory (RAM).

9. The method of claim 1 wherein said decoding is performed by a second subsystem.

10. The method of claim 9 wherein said second subsystem comprises a second digital logic circuitry and a second software module.

11. The method of claim 9 wherein said one or more parameters is used by said second subsystem to perform said decoding.

12. The method of claim 1 wherein said type of video comprises high definition (HD) or standard definition (SD).

13. The method of claim 1 wherein said MPEG video comprises MPEG I or MPEG II video.

14. The method of claim 1 wherein said number of video frame buffers implemented is inversely proportional to frame resolution.

15. The method of claim 1 wherein said number of video frame buffers is increased by the ratio (1920×1088)/(720×480) when said type of video received corresponds to SD MPEG video.

16. The method of claim 1 further comprising parsing said MPEG video into one or more segments prior to said arranging, each of said one or more segments comprising one or more frames, wherein only the first frame of each of said one or more segments is an I frame.

17. A method of efficiently decoding MPEG video bit stream, determining the type of MPEG video received; implement a first number of video frame buffers based on said type of MPEG video received, said decoder to implement a reverse play or slow rewind function.

18. The method of claim 17 further comprising generating one or more feeding sessions based on said first number of video frame buffers.

19. The method of claim 18 wherein a second number of frames displayed in each of said one or more feeding sessions is limited to said first number of video frame buffers.

20. The method of claim 19 wherein each of said one or more feeding sessions comprises a minimum number of I, P, and B frames required to adequately decode and display said second number of frames.

21. The method of claim 17 wherein said implementing a number of video frame buffers maximizes the use of an available memory space.

22. The method of claim 17 wherein said type of MPEG video received comprises HD or SD.

23. The method of claim 18 wherein an algorithm is used to determine one or more parameters that define said one or more feeding sessions.

24. The method of claim 23 wherein said one or more parameters comprises a first number of frames to be decoded, a second number of frames to be displayed, a third number of reference frames to be displayed, and a fourth number of B frames to be displayed.

* * * * *